April 24, 1928.

L. G. SIMONSEN 1,667,443

GAS EXPELLING DEVICE

Filed Aug. 15 1927

Inventor
L. G. Simonsen

By James W. Martin
Attorney

Patented Apr. 24, 1928.

1,667,443

UNITED STATES PATENT OFFICE.

LORENSE G. SIMONSEN, OF BENSON, NEBRASKA.

GAS-EXPELLING DEVICE.

Application filed August 15, 1927. Serial No. 212,985.

The invention relates to gas expelling devices for expelling gas from the stomach of animals, particularly cows, and has for its object to provide a device of this character formed from an elongated flexible tubular member formed from spirally twisted wire whereby it will have a wide range of flexibility and one end of which has its convolutions spaced apart and a plug for the end thereof, said spaced convolutions forming means whereby gas will enter the tubular member when the plugs end thereof enters the gas zone within the stomach.

A further object is to provide a flat member having oppositely disposed recesses, and which flat member is adapted to be placed in the mouth of the animal for holding the mouth open when said flat member is turned to a vertical position. The opposite sides of the flat member are provided with recesses for the reception of the upper jaw and the tongue of the animal. Also to provide an aperture in the flat member, through which the flexible member may be inserted when forcing the same down the throat of an animal.

A further object is to provide one end of the flexible member with a flared portion having its convolutions in spaced relation and which flared portion is adapted to be inserted in the throat of an animal for dislodging and holding an obstruction, for instance a piece of vegetable.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

Figure 1:
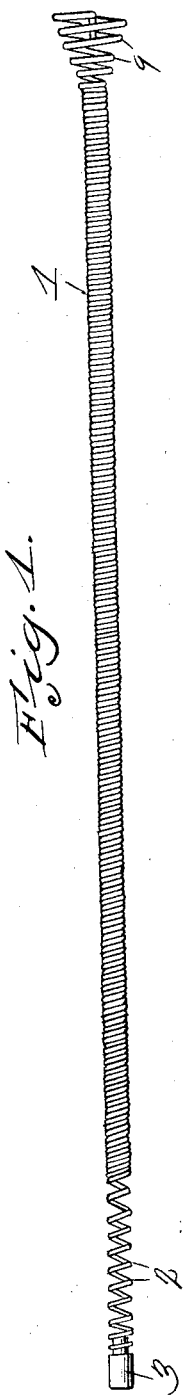
Figure 1 is a side elevation of the device.
Figure 2:
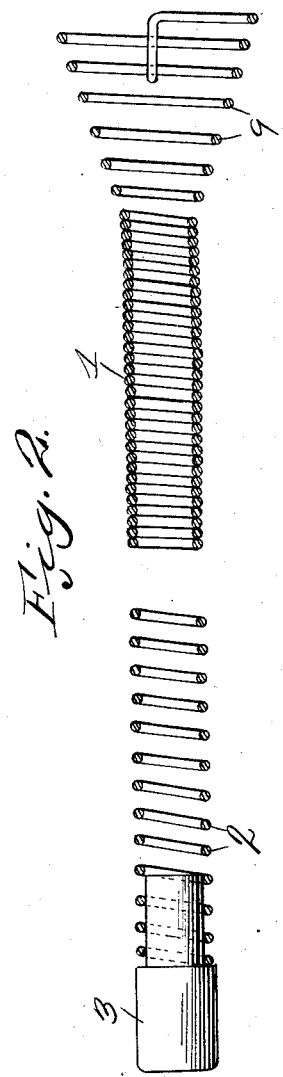
Figure 2 is an enlarged longitudinal sectional view through the device.
Figure 3:
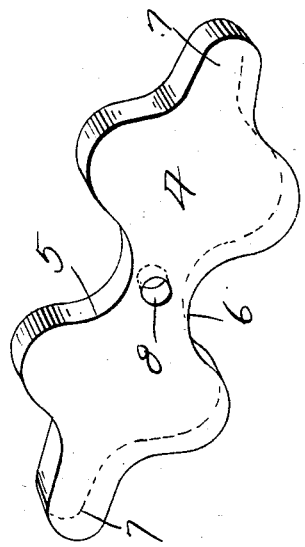
Figure 3 is a perspective view of the jaw holding and guiding device.

Referring to the drawing, the numeral 1 designates an elongated flexible tubular member which may be of any length desired, and which tubular member is formed from wire twisted to form, thereby forming a device having a relatively wide range of flexibility. One end of the tubular member has its convolutions 2 in spaced relation whereby when it enters the stomach gas will easily pass to the interior of the flexible member and thence longitudinally therethrough to the atmosphere. This end is provided with a plug 3 rounded off whereby it will easily guide in entering the stomach.

In operation a flat member 4 is forced in horizontal position into the mouth of the animal, and after the member 4 is in the mouth it is turned to a vertical position whereby the upper jaw of the animal will be received in the recess 5 thereof, and the tongue and lower jaw in the recess 6, thereby allowing room for the tongue. During this operation the operator grasps the opposite ends 7 of the member 4. After the member 4 has been inserted as above set forth, the flexible member is then passed through the aperture 8 in the member 4, and which aperture will guide the member 1 as it enters and is forced down the throat of the animal to the gas zone. Just as soon as the forward portion of the device formed by the convolutions 2 reaches the gas zone, the gases will be exhausted to the atmosphere through the flexible tubular member, thereby instantly relieving the animal.

The outer end of the tubular member 1 is flared and has its convolutions 9 in spaced relation, and this end of the device may be inserted in the throat for dislodging and gripping obstructions, for instance a piece of vegetable, therefore it will be seen that the device has a double function, that of relieving gas and that of dislodging obstructions.

From the above it will be seen that a gas relieving device is provided for animals, which is formed from a tubular member, formed from wire convolutions, the device is simple in construction, can be cheaply manufactured and sold, and the parts are reduced to a minimum.

The invention having been set forth what is claimed as new and useful is:—

A gas relieving device of the character described comprising a flat jaw holding device having a central aperture and recesses in its upper and lower edges, a flexible tubular member adapted to be inserted through said aperture, said tubular member being formed from wire convolutions, the wire convolutions of the tubular member at the forward end of the device being in spaced relation.

In testimony whereof I hereunto affix my signature.

LORENSE G. SIMONSEN.